United States Patent [19]

Pekar

[11] Patent Number: 5,432,503
[45] Date of Patent: Jul. 11, 1995

[54] ELECTRONIC SLOPE DETECTOR

[75] Inventor: Gary W. Pekar, Arlington, Tex.

[73] Assignee: Vought Aircraft Company, Dallas, Tex.

[21] Appl. No.: 87,393

[22] Filed: Jul. 2, 1993

[51] Int. Cl.⁶ ............................................. G08B 21/00
[52] U.S. Cl. .................................. 340/680; 340/686; 340/689; 33/546
[58] Field of Search ...................... 340/680, 686, 689; 33/366, 560, 546, 547, 551, 552, 533; 200/61.45 R

[56] References Cited

U.S. PATENT DOCUMENTS

| | | | |
|---|---|---|---|
| 3,895,446 | 7/1975 | Orlou | 33/174 |
| 4,319,403 | 3/1982 | Stearns | 33/185 |
| 4,332,090 | 6/1982 | Bailey et al. | 33/366 |
| 4,425,061 | 1/1984 | Kindl | 408/16 |
| 4,430,803 | 2/1984 | Flanders | 33/366 |
| 4,434,558 | 3/1984 | Face, Jr. et al. | 33/365 |
| 4,503,622 | 3/1985 | Swartz et al. | 33/366 |
| 4,558,312 | 12/1985 | Yonemoto | 340/680 |
| 4,912,662 | 3/1990 | Butler et al. | 364/559 |
| 4,922,620 | 5/1990 | Terragni | 33/366 |
| 4,942,668 | 7/1990 | Franklin | 33/366 |
| 5,027,522 | 7/1991 | Cagan et al. | 33/366 |

Primary Examiner—Jeffery A. Hofsass
Assistant Examiner—Albert Wong
Attorney, Agent, or Firm—Richards, Medlock & Andrews

[57] ABSTRACT

An electronic bubble level display is provided for determining surface normality when coupled with three sensors (18, 20, 22) sensing distance to the surface. The signals from the sensors are provided to an electronic processor (34) for computing the surface angularity and translating the angularity to specific positions on an LED dot matrix display chip (38).

12 Claims, 6 Drawing Sheets

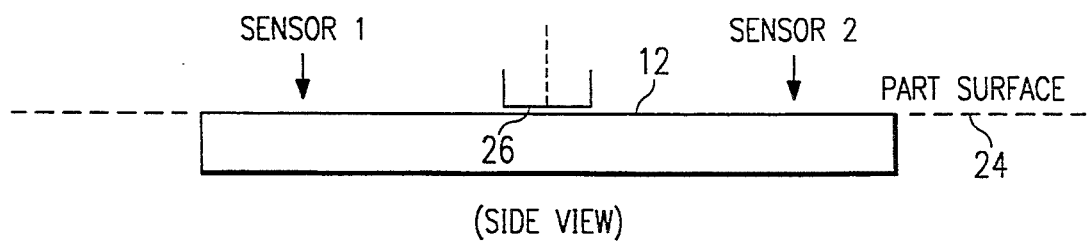
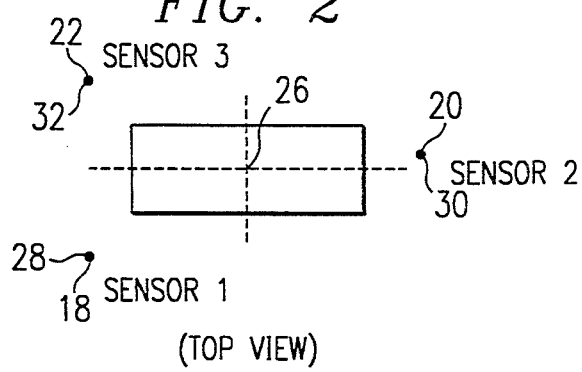
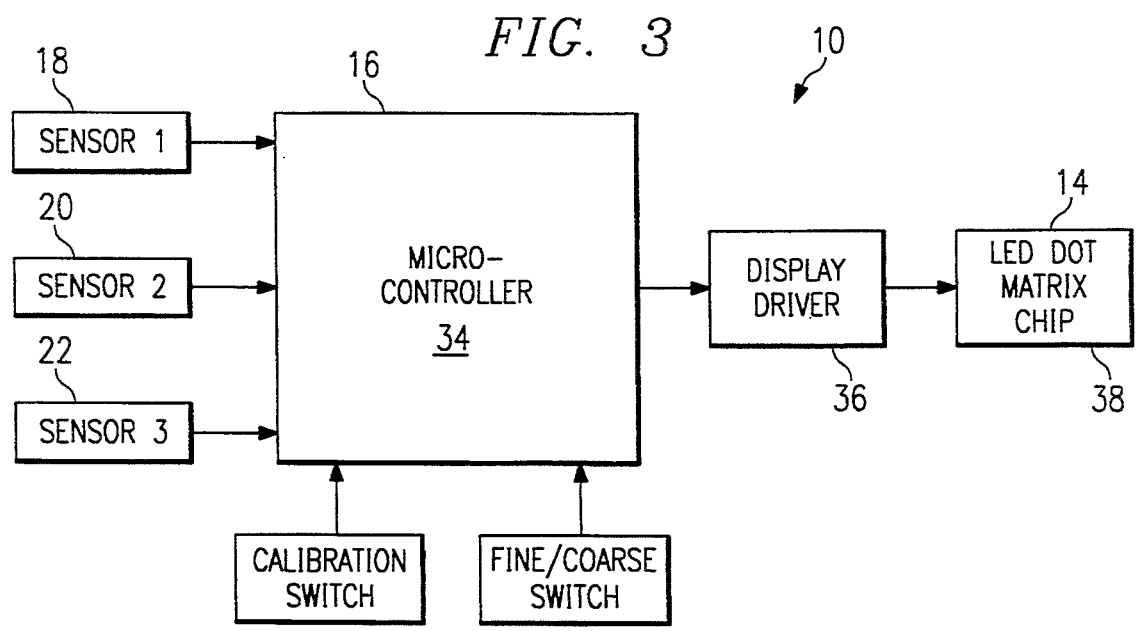

ELECTRONIC SLOPE DETECTOR

TECHNICAL FIELD OF THE INVENTION

This invention relates to a device for determining the orientation of a surface relative to the horizontal.

BACKGROUND OF THE INVENTION

Many applications require determining the orientation of a surface or plane. The well known manual gravity bubble level is one device to accomplish this task.

One specific application where the orientation of a surface is critical is automatic drilling and riveting of panels on an aircraft. Ideally, the rivet hole should be drilled normal to the surface being riveted for greatest effectiveness. However, the surface is often continuously curved in multiple directions, particularly when forming part of the wing structure.

The compound curvature of the skin structure makes it difficult to use a traditional manual level. Further, the market place demands significant automation in the process to reduce cost. Therefore, a need exists for a device to more effectively and efficiently determine the level of a surface to be riveted.

SUMMARY OF THE INVENTION

In accordance with one aspect of the present invention, a device is provided for determining the three dimensional orientation of a surface external to the device with regard to a reference plane. The device includes a body and at least three sensors mounted to the body at locations thereon which are spaced apart from each other so that the locations of the sensors define the reference plane. Each of the sensors provide an electrical signal which represents the distance from the respective sensor to the surface external to the device. An electrical processing circuit receives each of the electrical signals from the sensors and provides an indication of the orientation of the surface with respect to the reference plane.

In accordance with another aspect of the present invention, the sensors provide an electrical signal which represents the distance from the respective sensor to the surface along a line which is perpendicular to the reference plane. The sensors can provide an electrical signal representing the distance from the respective sensor to the surface without the respective sensor touching the surface.

In accordance with another aspect of the present invention, each sensor can include a sensor body, a probe element and structure for biasing the position of the probe element with respect to the sensor body along a line having a predetermined orientation to the reference plane. The structure can provide an electrical signal representing the position of the probe element with respect to the sensor body.

In accordance with another aspect of the present invention, the sensors can be ultrasonic, laser, low voltage differential transformers (LVDT) or potentiometer devices.

BRIEF DESCRIPTION OF THE DRAWINGS

For a more complete understanding of the present invention, and for further advantages thereof, reference is now made to the following Detailed Description taken in conjunction with the accompanying drawings, in which:

FIG. 1 is a side view of a surface and a portion of a sensor device forming a first embodiment of the present invention to detect the orientation of the surface;

FIG. 2 is a top view of the surface showing the position of the three sensors;

FIG. 3 is a block diagram of the function of the sensor device;

DETAILED DESCRIPTION

Figure 4A:
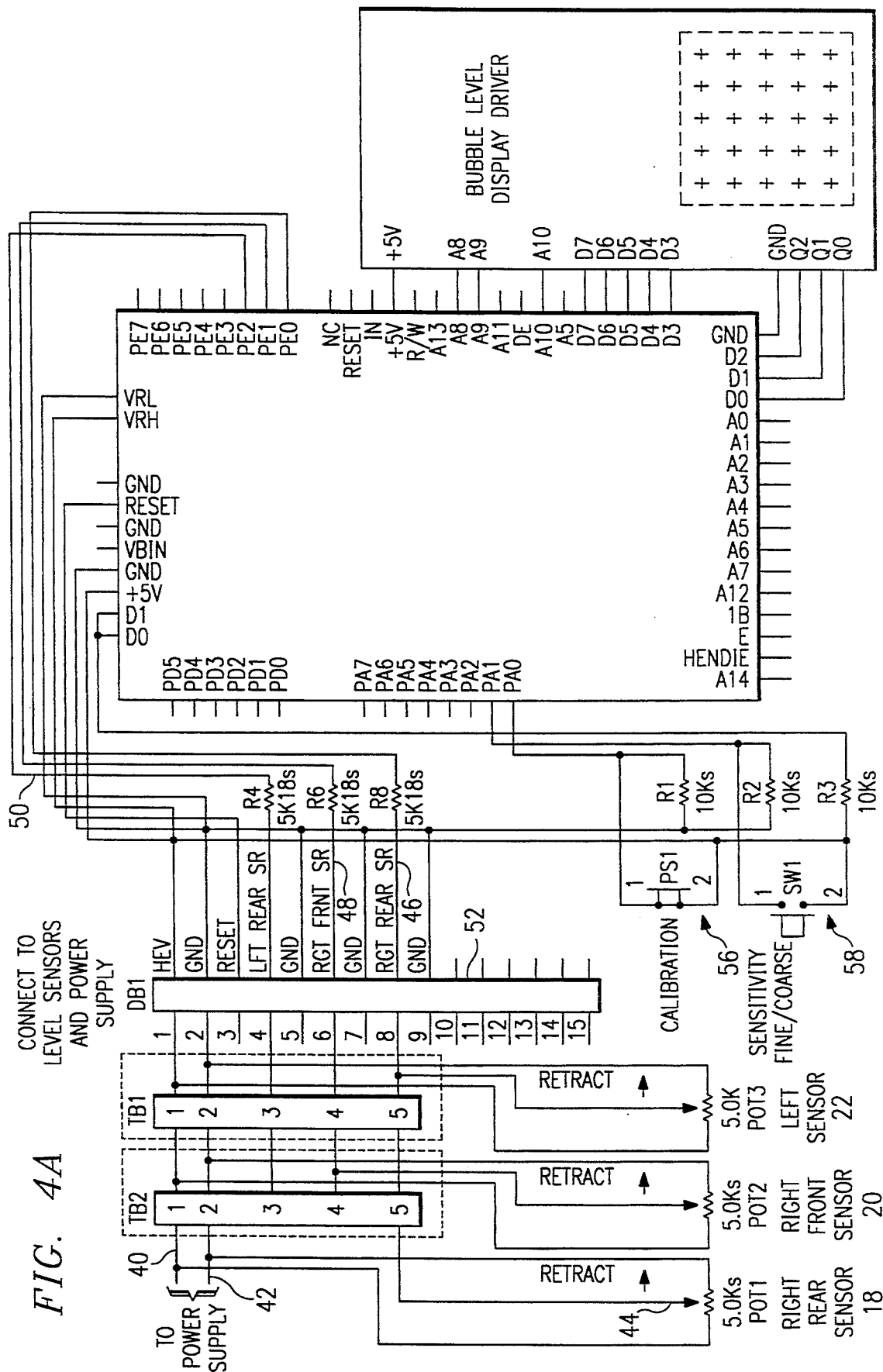
FIGS. 4A and 4B are a detailed schematic of the operation of the sensor device.

With reference now to the accompanying drawings wherein like reference numerals designate similar parts throughout the several views, an automated electronic bubble level 10 forming a first embodiment is illustrated. The electronic bubble level 10 is used to determine the angular orientation of a part surface 12 relative to gravity and to display that relation on an output display 14.

The electronic bubble level 10 includes a body 16 having three sensors, a right rear sensor 18, a right front sensor 20 and a left sensor 22. The sensors are used to determine the orientation of three spaced points on the parts surface as seen in FIG. 2 and uses those three points 28, 30 and 32 to define a reference plane 24 which will be at an angle corresponding to the surface at the point 26 to be riveted or drilled. Body 16 can be a drill which has a drill bit extending therefrom to drill along an axis perpendicular to the reference plane.

Figure 6A:
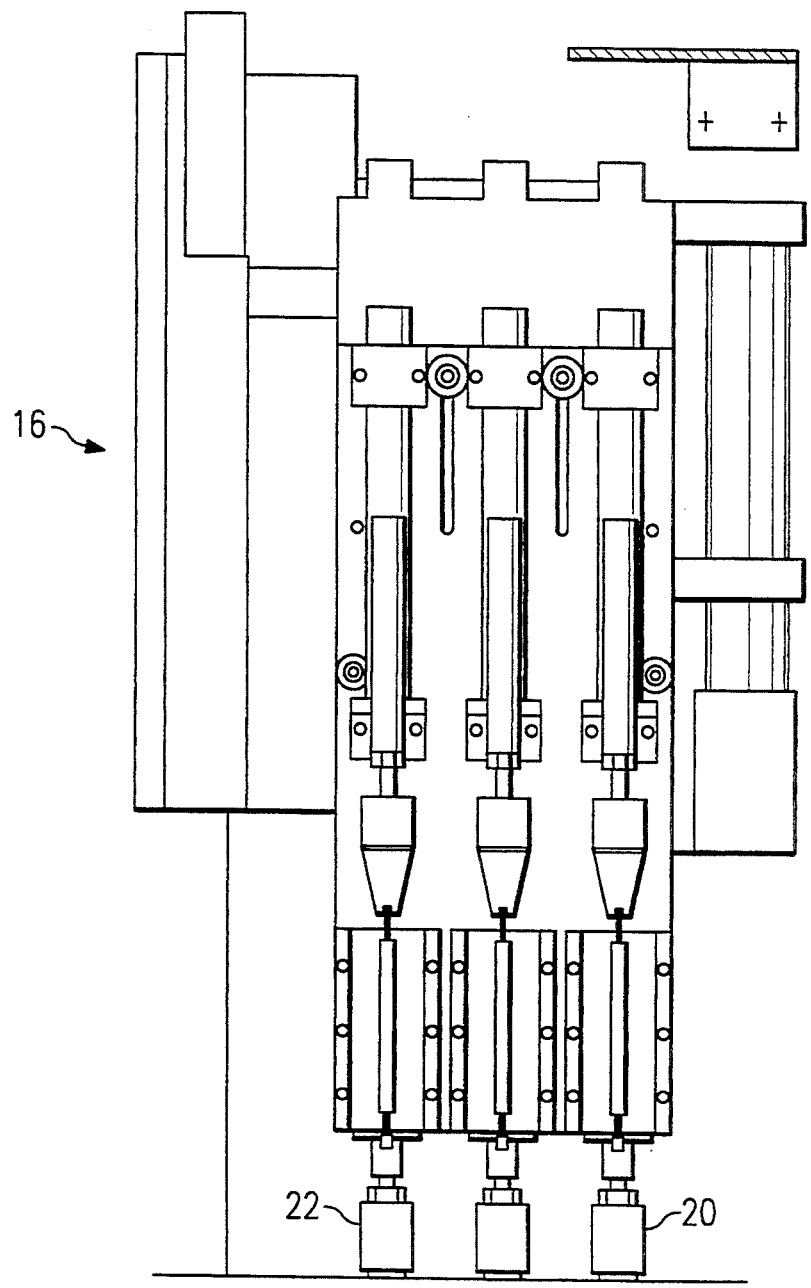
FIG. 6A and FIG. 6B are illustrative views of the body showing the sensors thereon.
Figure 6B:
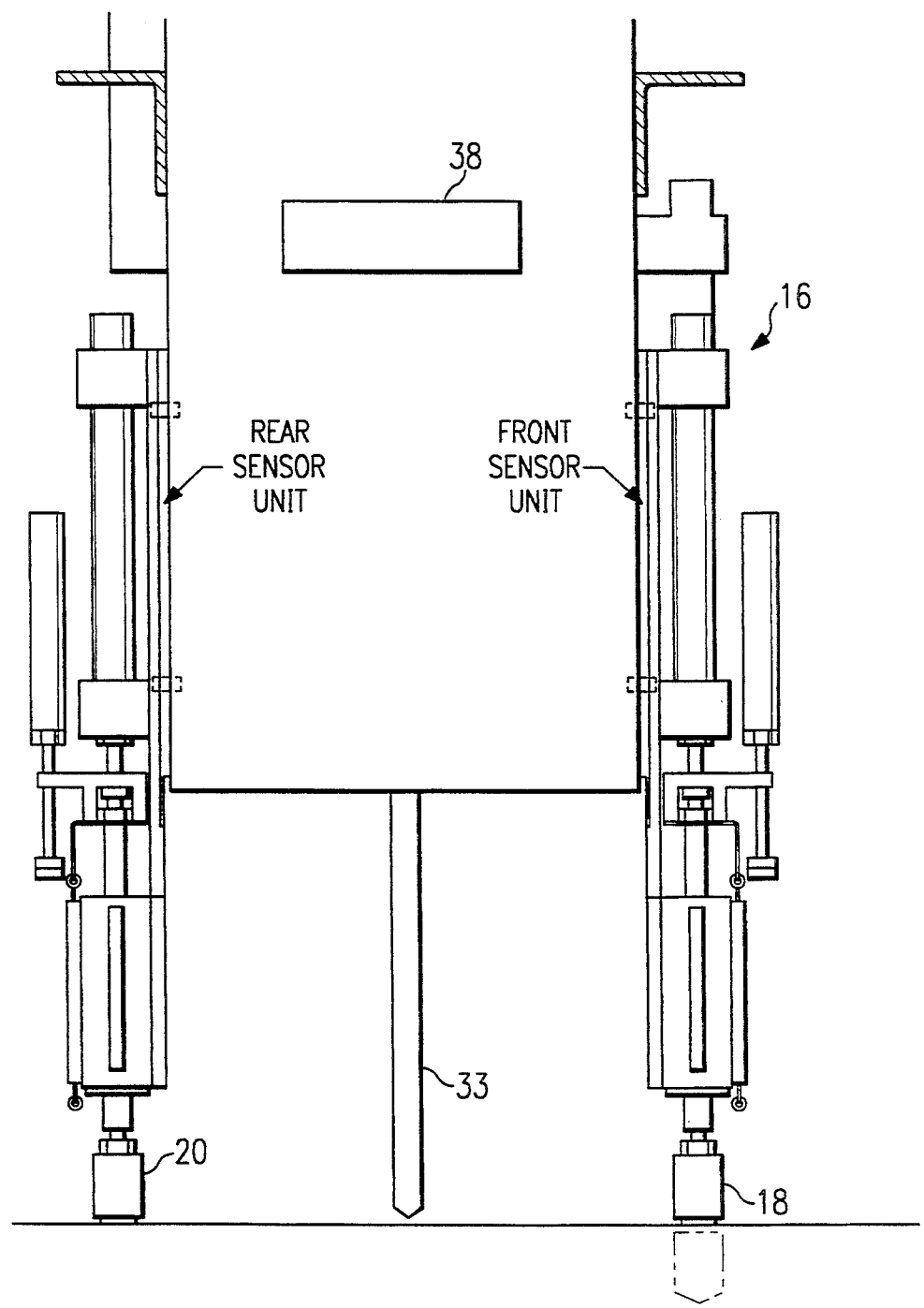

FIGS. 6A and 6B illustrate the bubble level 10 mounting the sensors 18, 20 and 22 thereon. FIG. 6B illustrates the mounting of a drill bit 33 on the mobile level 10 to perform a drilling operation.

With reference to FIGS. 1 and 2, the right rear sensor 18 can be seen to determine the position of point 28, the right front sensor 20 is used to determine the position of point 30 and the left sensor 22 is used to determine the position of point 32 on the part surface 12.

With reference to FIG. 3, the output of the sensors 18, 20 and 22 is provided to a microcontroller 34 which electronically defines the reference plane and transmits that information through a display driver 36 for display on an LED dot matrix chip 38.

The sensors 18, 20 and 22 can be of many different constructions. For example, the sensors can be ultrasonic, laser, low voltage differential transformer (LVDT) or potentiometer devices. Thus, the sensors do not even need to be in contact with the part surface 12 when using devices such as ultrasonic or laser sensors.

Figure 4B:
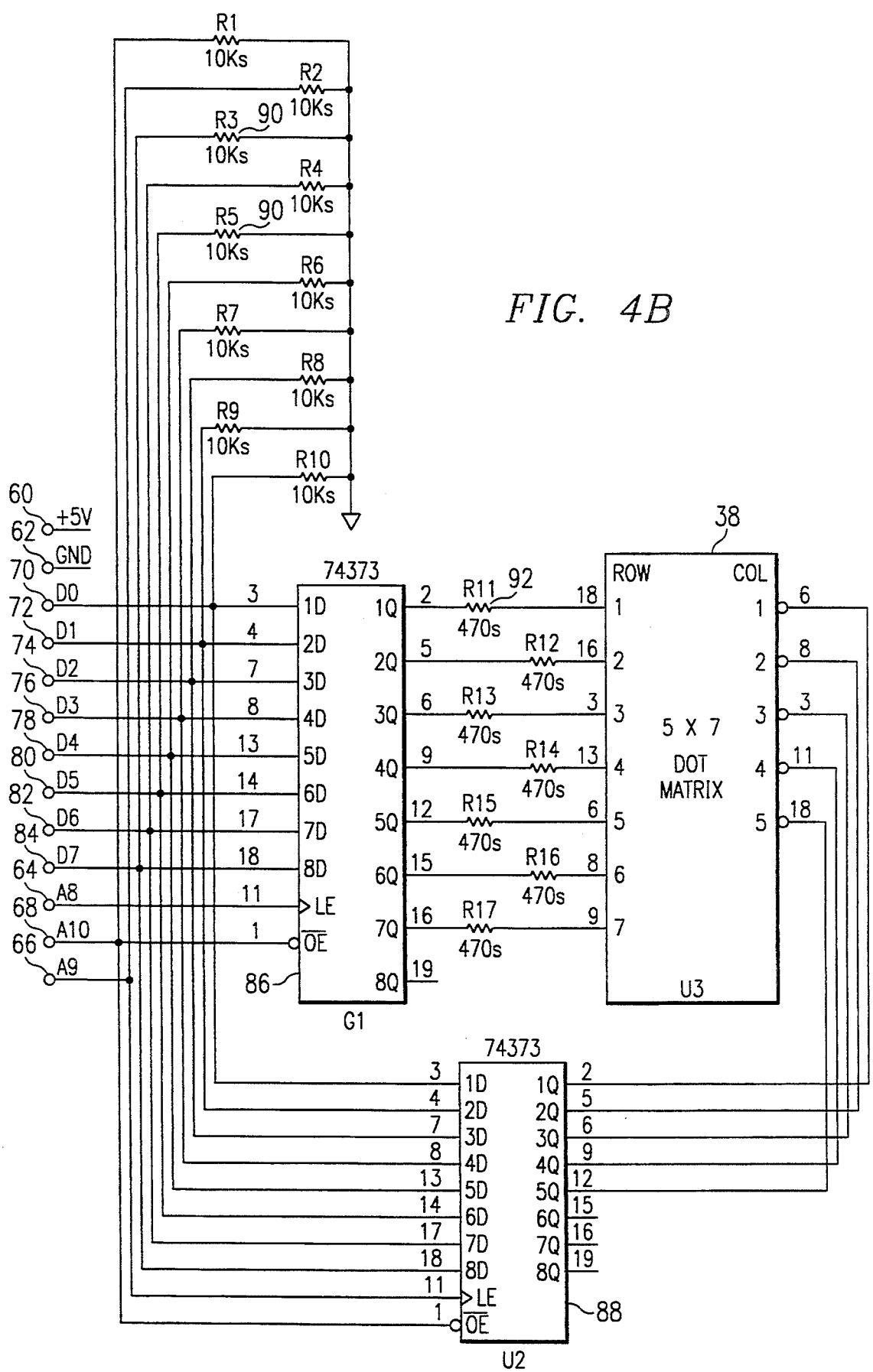
Figure 5A:
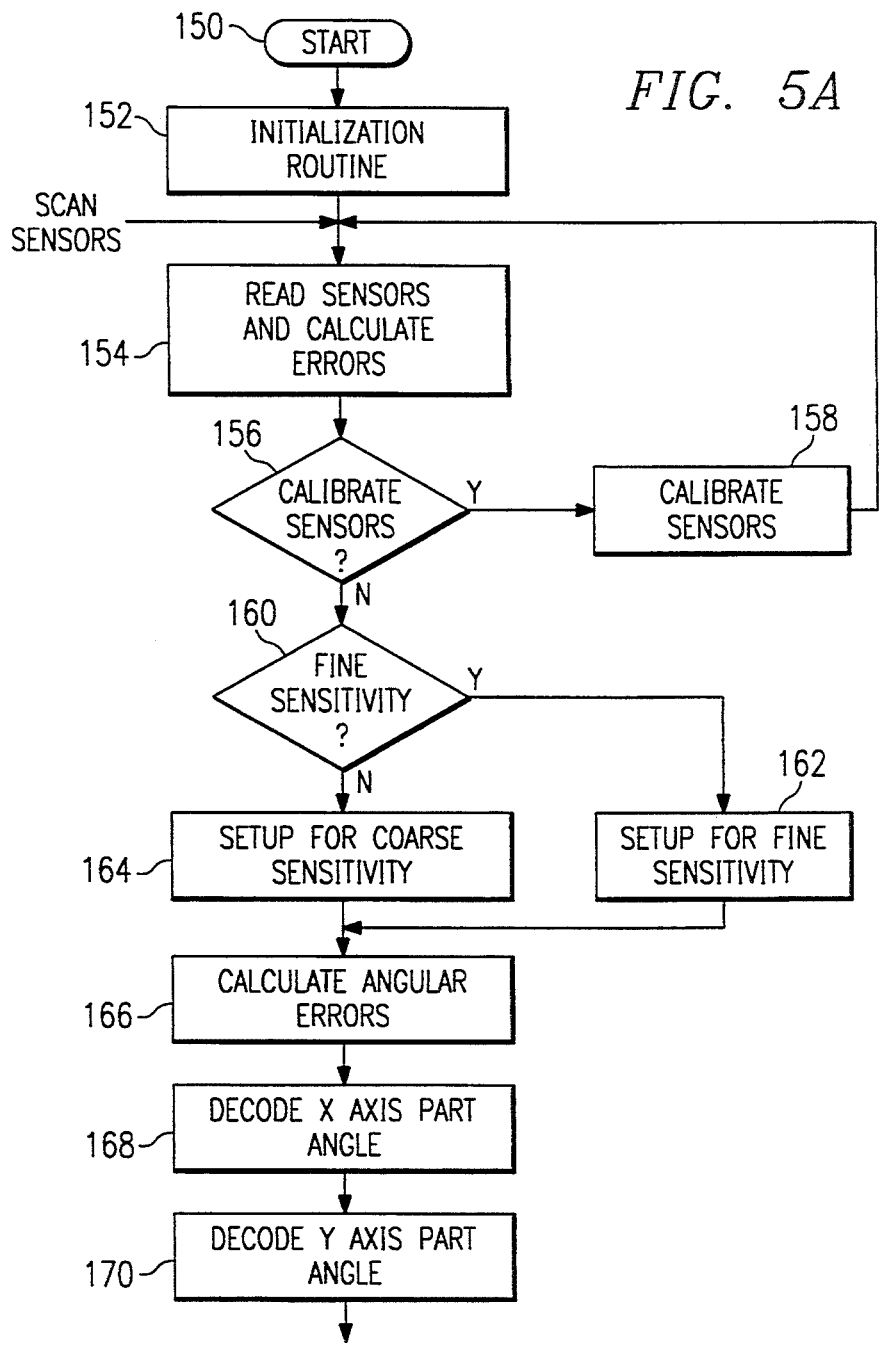
FIGS. 5A and 5B are a flow chart of the computer program used to process the sensor position data and calculate the angular orientation for display.
Figure 5B:
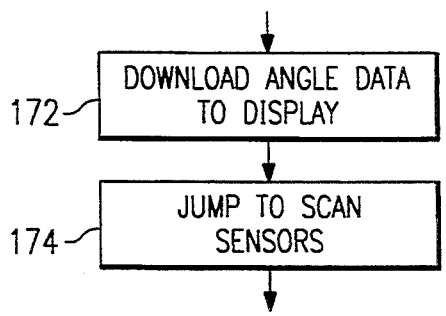

With reference now to FIGS. 4A and 4B, the details of one device constructed in accordance with the teachings of the present invention will be described. FIGS. 4A and 4B illustrate a schematic of the device. A power supply, not shown, provides a +5 volt line 40 and a ground line 42. Each of the sensors 18, 20 and 22 is a 5 kilo ohm potentiometer with a wiper arm 44 which is positioned as a function of the location of the point, 28, 30, and 32, respectively. The line from the wiper arm of the right rear sensor 18 is line 46. The line from the wiper arm of the right front sensor 20 is sensor line 48. The line from the wiper arm 44 of the left sensor 22 is sensor line 50. These lines, and the power supply lines, are connected through a connector 52 to the input of microcontroller 34. The microcontroller is a New Micros, Inc. No. NMIS-0021. The microcontroller has been programmed with a program known as Bublevel .S19 which takes the input data of sensor positions from sensors 18, 20 and 22 and calculates the position of a plane containing all three points sensed by sensors 18, 20 and 22. FIGS. 5A and 5B are a flow chart of the control functions of the microcontroller. While a specific microcontroller is mentioned above, it will be understood that any suitable controller can be utilized. The controller begins with a start step 150 which leads into an initialization routine 152. Step 154 then reads sensors 18, 20 and 22 and calculates errors. Step 156 then asks the question if the sensors are to be calibrated. If so, step 158 is taken to calibrate the sensors and the program is returned to step 154. If not, step 160 then asks if the sensitivity is to be fine. If yes, step 162 is the set up for fine sensitivity. If not, step 164 is the set up for coarse sensitivity. After sensitivity determination, step 166 is the calculation of the angular errors. Step 168 decodes the X axis part angle and step 170 decodes the Y axis part angle. With reference to FIG. 5B, step 172 downloads the X and Y angle data to the display. Step 174 represents the return to the initial start of the program for scanning sensors. A print out of a program for use on the microcontroller noted above is set out on the pages hereof immediately prior to the claims. The +5 volt line 40 is connected to the +5 volt terminal and the VRH terminal on the controller 54. The ground is connected to the ground terminal and VRL terminal on the controller 54. The sensor lines each pass through a resistor, having resistance of 5 kilo ohms, to ports PE0, PE1 and PE2 in the controller 34.

The +5 volt line is also connected to a calibration circuit 56 and a sensitivity fine/coarse circuit 58. In the sensitivity circuit 58, the coarse selection determines slope at increments of ±2, 4, 6 and 8 degrees in both the left/right direction and the forward/reverse direction. The fine sensitivity selection measures ±1, 2, 4 and 6 degrees in both the left/right direction and the forward/reverse direction.

The controller 34 will analyze the input from the sensors and will create a reference plane on which the three points 28, 30 and 32 lie. Since the three points are spaced apart, only one unique plane will contain all three points. The controller 34 will then determine the slope of this reference plane, which will correspond to the slope of the part surface at the point 26 being measured. The calculated slope is then displayed on the bubble level display chip 38.

To accomplish the display, the controller 34 outputs a +5 volt line 60, a ground line 62, lines 64, 66 and 68 and display lines 70–84. The lines are connected to a pair of octal transparent free state latches 86 and 88, each latch being a 74HC373 integrated circuit. Each line is connected to ground through a resistor 90 having a value of 10 kilo ohms for the purpose of pull down resistance. Inputs to 74HC373 devices will float without these resistors.

Output from the latches 86 and 88 are provided to the 5×7 dot matrix display chip 38. The chip is a Model HDSP-4501 manufactured by Hewlett-Packard. The lines from latch 86 each pass through a resistor 92 having a value of 470 ohms to the row input of display chip 38. The purpose of this resistor is current regulation which controls LED intensity. The output from latch 88 goes to the column input of chip 38. The dot matrix chip display 38 defines a 5×7 matrix of LEDs. This display will give a visual display of the slope of the surface being measured.

As can be seen, the device of the present invention will define a reference plane electronically and display the slope of that reference plane to the user. This slope corresponds to the slope of the surface of the point 26. Therefore, if a hole is to be drilled at point 26, the drill bit can be positioned precisely normal the surface to be drilled, preventing the drill bit from being deflected or skipping off of the point and insuring an effective hole is drilled through the material for subsequently receiving a rivet.

Although one embodiment of the invention has been illustrated in the accompanying drawings and described in the foregoing Detailed Description, it will be understood that the invention is not limited to the embodiment disclosed, but is capable of numerous rearrangements, modifications and substitutions of parts and elements without departing from the spirit and scope of the invention.

```
0001              * THIS SOFTWARE IS FOR A MOTOROLA 68HC11 MICRO-CONTROLLER. THIS
0002              * SYSTEM WILL BE USED TO DETERMINE PART NORMALITY ON THE VOUGHTMATIC
0003              * RIVETING MACHINES. A LED DISPLAY WILL EMMULATE A BUBBLE LEVEL USING
0004              * THREE ANALOG INPUT VALUES AS FEEDBACK.
0005              *
0006              * CONTACT G. W. PEKAR MAINTECH FOR INFORMATION.
0007              *
0008              *
0009                NAN BUBLEY
0010 0010           ORG $10
0011 0010 10      SAMPLE FCB $10 ;SAMPLE ANALOG INPUT
0012 0011 98      CONFIG FCB $90 ;CONFIG HC11 FOR ANALOG INPUT
0013 0012 01      CALBUT FCB $01 ; CALIBRATION BUTTON
0014 0013 01      ROW1 FCB $01 ;DISPLAY
0015 0014 02      ROW2 FCB $02 ;DISPLAY
0016 0015 04      ROW3 FCB $04 ;DISPLAY
0017 0016 08      ROW4 FCB $88 ;DISPLAY
0018 0017 10      ROW5 FCB $10 ;DISPLAY
0019 0018 20      ROW6 FCB $20 ;DISPLAY
0020 0019 40      ROW7 FCB $40 ;DISPLAY
0021 001a 25      ANGLX1 FCB $25 ;¼ DEGREE ANGLE
0022 001b 70      ANGLX2 FCB $70 ;½ DEGREE ANGLE
0023 001c b0      ANGLX3 FCB $B0 ;1 DEGREE ANGLE
0024 001d d0      ANGLX4 FCB $d0 ;2 DEGREE ANGLE
0025 001e 01      COL1 FCB $01 ;DISPLAY
0026 001f 02      COL2 FCB $02 ;DISPLAY
0027 0020 04      COL3 FCB $04 ;DISPLAY
```

```
0028 0021 08            COL4 FCB $08 ;DISPLAY
0029 0022 10            COL5 FCB $10 ;DISPLAY
0030 0023 20            COL6 FCB $20 ;DISPLAY
0031 0024 40            COL7 FCB $40 ;DISPLAY
0032 0025 25            ANGLY1 FCB $25 ;¼ DEGREE ANGLE
0033 0026 70            ANGLY2 FCB $70 ;½ DEGREE ANGLE
0034 0027 b8            ANGLY3 FCB $80 ;1 DEGREE ANGLE
0035 0028 d0            ANGLY4 FCB $D0 ;2 DEGREE ANGLE
0036 0029 01            RSTROBE FCB %00000001 ;ROW STROBE TO LATCH DATA
0037 002a 02            CSTROBE FCB %00000010 ;COLUMN STROBE TO LATCH DATA
0038 002b 04            DISPENBL FCB %0000100 ;ROW AND COLUMN ENABLE BIT
0039 002c 00            FLAG0 FCB $80 ;FLAG = $08
0040 0001               CALCMPL EQU $0001 ;CALIBRATION COMPLETE FLAG
0041 0002               NEGTSTX EQU $0002 ;CONDITION CODE REGISTER/ LFS-RFS
0042 0003               NEGTSTY EQU $0003 ;CONDITION CODE REGISTER/ RRS-RFS
0043 0004               CALSTRT EQU $0004 ;CALIBRATION START BP (PA8)
0044 0005               LFSXOFS EQU $0005 ;LFS OFFSET
0045 0006               RFSXOFS EQU $0006 ;RFS OFFSET
0046 0007               RRSYPF9 EQU $0007 ;RRS OFFSET
0047 0008               RFSYOFS EQU $0008 ;RFS OFFSET
0048 0009               ADCTLR EQU $0009 ;SAMPLE REGISTER FLAG
0049 000a               XSUMA EQU $000A ;XSUM ABSOLUTE
0050 000b               YSUMA EQU $000B ;YSUM ABSOLUTE
0051 000c               ROW EQU $000C ;DISPLAY ROW
0052 000d               COL EQU $000D ;DISPLAY COLUMN
0053 0041               XSUM EQU $0041 ;LFS-RF8
0054 0042               YSUM EQU $0042 ;RRS-RF5
0055 1000               PORTA EQU $1000 ;MICROCONTROLLER I/O PORT /USED FOR CAL BUTTON
0056 1003               PORTC EQU $1003 ;DISPLAY DATA BUS
0057 1004               PORTB EQU $1004 ;LATCH AND ENABLE OUTPUTS FOR DISPLAY
0058 1830               ADCTL EQU $1030 ;SAMPLE REGISTER
0059 1031               LFS EQU $1031 ;LEFT FRONT SENSOR
0060 1032               RFS EQU $1032 ;RIGHT FRONT SENSOR
0061 1033               RRS EQU $1033 ;RIGHT REAR SENSOR
0062 1039               OPTION EQU $1839 ;ANALOG CONFIG REGISTER
0063 F809               CALROUT EQU $F889 ;CALIBRATION ROUTINE START ADDRESS
0064 48                 NONACOSS_518
66                      * MOTOROLA 68MC11 INITIALIZATION
67                      *
68 F800 96 11              LDAA CONFIG ;INITIALIZE HC11 FOR ANALOG INPUT MODE SINGLE SCAN
69 1800 B7 18 39           STAA OPTION ;AND MULTIPLE CHANNEL READ
78                      *
71                      * CHECK SENSOR CALIBRATION BIT/ JUMP TO CAL ROUTINE IF SET
72                      *
73 1005                 READSENSOR EQU *
74 1885 12 66 12 08        BRSET PORTA CALBUT CALROUT
75                      *
76                      * READ SENSORS AND CALCULATE ERRORS
77                      *
78 F809 96 10              LDAA SAMPLE ;SCAN SENSORS
179 F80b b7 10 30          STAA ADCTL
088 f00e                LOOP1 EQU *
081 F80e b6 10 30          LDAA ADCTL
082 F811 97 89             STAA ADCTLR
083 F813 12 89 98 82       BRSET ADCLTR #$90 LOOP2
084 f817 28 f5             BRA LOOP1
085 f819               LOOP2 EQU *
086 f819 b6 10 31          LDAA LFS ;SUBSTRACT LFS FROM RFS/ INCLUDE CALIBRATION OFFSETS
087 f81c 9b 05             ADDA LFSXOFS
088 f81e f6 18 32          LDAB RFS
089 f821 db 86             ADDB RFSIOFS
098 f823 10                SBA
091 f824 97 41             STAA XSUM
092 f826 07                TPA ;TRANSFER FROM CC REG TO ACCA
093 f827 97 82             STAA NEGTSTX ;TEST FRO NEG SUM X ;REM CC REG
094 f829 b6 10 33          LDAA RRS ;SUBTRACT RRS FROM RFS/ INCLUDE CALIBRATION OFFSETS
095 f82c 9b 07             ADDA RRGYOFS
096 f82e f6 10 32          LDAB RFS
097 1831 db 08             ADDB RFSYOFS
098 f033 10                SBA
099 f834 07                TPA NEGTSTY ;TEST FOR NEG SUM Y ;REM CC REG
100 f835 97 42             STAA YSUM
181                     *
182                     * THIS ROUTINE WILL DECODE X PART ANGLE INTO THE LED DISPLAY POSITION.
183                     *
184                     *
185 f837 96 8a             LDAA XSUMA ;LOAD XSUM ABSOLUTE
0186 f839 d6 1a            LDAB ANGLX1 ;TEST FOR x+ ANGLE > ¼ DEGREE
0187 f83b 11               CBA
0188 f83c 24 06            BHS TANSLX2 ;BRANCH IF ERROR > ¼ DEGREE
0189 f83e 96 16            LDAA ROW 4
0110 f840 97 8c            STAA ROW
```

-continued

```
0111 f842 20 39              BRA YDECODE ;BRANCH TO YSUM DISPLAY DECODE ROUTINE
0112 f044                    TANGLX2 EQU *
0113 f844 d6 1b                LDAB ANGLX2 ;TEST FOR X ANGLE > ½ DEGREE
0114 f846 11                   CBA
0115 f847 24 10                BHS TANGLX3 ;BRANCH IF ERROR > ½ DEGREE
0116 f849 12 02 01 06          BRSET NEGTSTX $01 NEGROW3
0117 f184d 96 17               LDAA ROW5
0118 f84f 97 8c                STAA ROW
0119 f851 28 29                BRA YDECODE
0120 f853                    NEGROW3 EQU $
0121 f853 96 15                LDAA ROW 3
0122 f855 97 0c                STAA ROW
0123 f857 20 23                BRA YDECODE
0124 F859                    TANGLX3 EQU $
0125 f859 d6 1c                LDAS ANGLX3 ;TEST FOR ERROR > 1 DEGREE
0126 f85B 11                   CBA
0127 f85c 24 10                BHS TANGLX4 ;BRANCH IF ERROR > 1 DEGREE
0128 f85e 12 02 01 06          BRSET NEGTSTX $01 NEGROW 2
0129 f862 96 10                LDAA ROW 6
0130 f864 97 0r                STAA ROW∅
0132 f868                    NEGROW2 EQU *
0133 f868 96 14                LDAA ROW2
-134 f86a 97 0c                STAA ROW
0135 f186c 28 0e               BRA YDECODE
0136 f86e                    TANGLX4 EQU *
0137 f86e 12 02 01 06          BRSET NEGTSTX $01 NEGROW1
0138 f872 96 19                LDAA ROW7 ;ANGLE IS > 2 DEGREE
0139 f874 97 0c                STAA ROW
0148 f876 20 04                BRA YDECODE
0141 f878                    NEGROW1 EQU $
0142 f878 96 13                LDAA ROW 1
0143 f87a 97 0c                STAA ROW
0144                         *
0145                         * THIS ROUTINE WILL DECODE y PART ANGLE INTO THE LED DISPLAY POSITION.
0146                         *
0147 f87C                    YDECODE EQU $
0148 f87C 96 0b                LDAA YSUMA ;LOAD YSUM ABSOLUTE
0149 f87e d6 25                LDAB ANGLY1 ;TEST FOR Y ANGLE > ¼ DEGREE
0158 f880 11                   CBA
0151 f881 24 86                BHS TANGLY2 ;BRANCH IF ERROR > ¼ DEGREE
0152 f833 96 20                LDAA COL3
0153 f885 97 8d                STAA COL
0154 f887 28 26                BRA YDECODEND ;BRANCH TO YSUM DISPLAY DECODE ROUTINE
0155 f889                    TANGLY2 EQU $
0156 f889 d6 26                LDAB ANGLY2 ;TEST FOR Y ANGLE > ½ DEGREE
0157 f88b 11                   CBA
0158 f88c 24 10                BHS TANGLY3 ;BRANCH IF ERROR > ½ DEGREE
0159 f88e 12 03 01 86          BRSET NEGTSTY %01 NEGCOL2
0160 f892 96 21                LDAA COL4
0161 f894 97 8d                STAA COL
0162 f896 20 17                BRA YDECODEND
0163 f898                    NEGCOL2 EQU *
0164 f898 96 1f                LDAA COL2
0165 f89a 97 0d                STAA COL
0166 f89c 20 11                BRA YDECODEND
0167 f89e                    TANGLY3 EQU *
0168 f89e d6 27                LDAB ANGLY3 ;TEST FOR ERROR > 1 DEGREE
0169 f8a0 11                   CBA
0178 f8a1 12 03 01 86          BRSET NEGTSTY $01 NEGCOL1
0171 f8a5 96 22                LDAA COL5
0172 f8a7 97 0d                STAA COL
0173 f8a9 20 04                BRA YDECODEND
0174 f8ab                    NEGCOL1 EQU *
0175 f8ab 96 1e                LDAA COL1
0176 f8ad 97 0d                STAA COL
0177 f8af                    YDECODEND EQU *
0178                         *
0179                         * THIS ROUTINE WILL DOWNLOAD ANGLE INFORMATION TO THE DISPLAY.
0180                         *
0181 f0af 96 0c                LDAA ROW
0182 f8b1 d6 29                LDAB RSTROBE
0183 f8b3 b7 10 03             STAA PORTC ;WRITE ROW DISPLAY DATA
0184 f0b6 f7 10 04             STAB PORTB ;LATCH ROW DISPLAY DATA
0185 f8b9 96 0d                LDAA COL
0186 f8bb d6 2a                LDAB CSTROBE
0187 f8bd b7 10 03             STAA PORTC ;WRITE COLUMN DISPLAY DATA
0188 f8c0 f7 10 04             STAB PORT0 ;LATCH COLUMN DISPLAY DATA
0189 f8c3 96 2b                LDAA DISPENBL ;ENABLE DISPLAY, TRISTATE LATCH
0190 f8c5 b7 10 03             STAA PORTC ;WRITE ENABLE DISPLAY, TRISTATE LATCH
0191 f8c8 7e f8 05             JMP READSENSOR ;JUMP TO BEGINNING OF PROGRAM TO READ SENSORS
0192                         *
0193                         *
```

-continued

| | | |
|---|---|---|
| 0194 | | * BEGIN SENSOR CALIBRATION ROUTINE |
| 0195 | | * |
| 0196 | | * |
| 0198 | | * |
| 0199 | | * THIS ROUTINE WILL TEST THE CALIBRATION BUTTON, MAKE SURE THE TEST |
| 0200 | | * PLATE IS PROPERLY CLAMPED. DEPRESS THE CALIBRATION START BUTTON. |
| 0201 | | * |
| 0202 | f8cb b6 10 00 | LDAA PORTA ;TEST THE CALIBRATION START BUTTON |
| 0203 | f8ce 97 84 | STAA CALSTRT |
| 204; Branch out of Range | | |
| 0204 | f8d8 12 04 01 fc | BRSET CALSTRT $01 CALROUT |
| 0285 | f8D4 20 f5 | BRA BEGINCAL |
| 0206 | | * |
| 0207 | | * THIS ROUTINE WILL CALIBRATE THE SENSORS |
| 0208 | | * |
| 0209 | f8d6 96 2c | LDAA FLAG0 ;SET ALL OFFSET MEMORY LOCATIONS TO 0. |
| 0210 | f8d8 97 85 | STAA LFSXOFS |
| 0211 | f8da 97 06 | STAA RFSXOFS |
| 0212 | F8dc 97 07 | STAA RRSYOFS |
| 0213 | f8de 97 08 | STAA RFSYOFS |
| 0214 | f8r0 b6 10 31 | LDAA LFS |
| 0215 | f8e3 f6 10 32 | LDAB RFS |
| 0216 | f8e6 10 | SBA ; LFS - RFS = XOFFSET |
| 0217 | f8e7 25 04 | BCS ABSXOFS ; BRANCH IF OFFSET = NEGATIVE |
| 0218 | f8e9 97 05 | STAA LFSXOFS |
| 0219 | f8eb 20 03 | BRA YSENSECAL ;BRANCH TO Y SENSOR CALIBRATION |
| 0220 | f8ed | ABSXOFS EQU * |
| 0221 | f8ed 48 | NEGA ; 2's COMPLEMENT / ABSOLUTE VALUE |
| 0222 | f8ee 97 06 | STAA RFSXOFS |
| 0223 | f8f8 | YSENSECAL EQU * |
| 0224 | f8f8 b6 10 33 | LDAA RRS |
| 0225 | f8f3 f6 10 32 | LDAB RFS |
| 0226 | f8f7 25 04 | BCS ABSYOFS ; BRANDH IF OFFSET = NEGATIVE |
| 0228 | f8f9 97 07 | STAA RRYOFS |
| 0229 | f0fB 20 03 | BRA CALDONE ; BRANCH TO CALIBRATION DONE |
| 0230 | f8fD | ABSYOFS EQU 1 |
| 0231 | f8fd 40 | NEGA ; 2'6 COMPLEMENT / ABSOLUTE VALUE |
| 0232 | f8fe 97 08 | STAA RFSYOFS |
| 0233 | f900 | CALDONE EQU * |
| 0234 | | * |
| 0235 | | % SET CALIBRATION COMPLETE BIT |
| 0236 | | * |
| 0237 | f900 86 01 | LDAA #$01 |
| 0238 | f902 97 01 | STAA CALCMPL |
| 0239 | f904 7e f8 05 | JMP READSENSOR ; CALIBRATION COMPLETE BRANCH TO MAIN PROGRAM N. |

I claim:

1. A device for determining the three-dimensional orientation of a surface external to the device with regard to a reference plane, the device comprising:
a body;
at least three sensors mounted to said body at locations thereon which are spaced apart from each other, at least one of the sensors being spaced from a line connecting the other sensors, each of said sensors sensing the distance to the surface from said sensor and providing an electrical signal which represents the distance from the respective sensor to said surface external to the device; and
an electrical processing circuit for receiving each of the electrical signals from the sensors, processing the signals to determine the orientation of the surface with the reference plane and providing an indication of the orientation of said surface with respect to said reference plane.

2. A device in accordance with claim 1 wherein each of said sensors provides said electrical signal which represents the distance from the respective sensor to said surface along a line which is perpendicular to said reference plane.

3. A device in accordance with claim 1 wherein each of said sensors provides said electrical signal representing the distance from the respective sensor to said surface without the respective sensor touching said surface.

4. A device in accordance with claim 1 wherein each of said sensors comprises a sensor body, a probe element mounted to the sensor body for movement along a line having a predetermined orientation to said reference plane, means mounted to said sensor body for biasing the probe element with respect to the sensor body in a first direction along the line having a predetermined orientation to said reference plane, and means mounted on said sensor body for providing an electrical signal representing the position of said probe element with respect to said sensor body.

5. A device in accordance with claim 1 wherein said body is the body of a positionable drilling unit, said drilling unit having a drill positioned on said body with the drill having a drilling axis, the sensors determining the orientation of the surface and positioning the drilling axis such that it is perpendicular to the surface.

6. A device in accordance with claim 5 further comprising a visual display connected to said electrical processing circuit for providing a visual indication of the relationship of said surface to said reference plane.

7. A device for determining the slope of a surface external to the device, said device comprising:
a body;
at least three sensors mounted to said body at locations thereon which are spaced apart from each other, at least one of the sensors being spaced apart from a line connecting the other sensors, each of said sensors measuring the distance from the sensor to a point on the surface and providing an electrical signal representing the distance of the position;

a microcontroller receiving the position of the points sensed by the sensors and having a program calculating the slope of a plane containing the three points sensed by said sensors; and a display displaying the slope calculated by the microcontroller of the surface.

8. The device of claim 7 wherein each of said sensors is in direct contact with the surface.

9. The device of claim 8 wherein each of said sensors is a potentiometer.

10. A method for determining the slope of a surface comprising the steps of:

positioning a body with at least three sensors proximate the surface, the sensors being spaced apart from each other at least one of the sensors being spaced apart from a line connecting the other sensors;

determining the position of at least three points on the surface with the sensors;

calculating the slope of a plane containing each of the points sensed by the sensors; and displaying the slope on a display.

11. The method of claim 10 further comprising the step of positioning the body, after calculating the slope of the plane, to orient the drilling axis of a drill mounted on the body perpendicular to the plane and drilling a hole through the surface perpendicular to the surface with the drill.

12. The method of claim 10 further comprising the step of calibrating the sensors prior to determining the position of at least three points on the surface with the sensors.

* * * * *